(12) United States Patent
Fang et al.

(10) Patent No.: US 11,334,064 B2
(45) Date of Patent: May 17, 2022

(54) CONTROL METHOD AND SYSTEM OF A MOVABLE DEVICE AND MOVABLE DEVICE THEREOF

(71) Applicant: SZ DJI TECHNOLOGY CO., LTD., Shenzhen (CN)

(72) Inventors: Wenzhao Fang, Shenzhen (CN); Xiang Teng, Shenzhen (CN); Deen Zheng, Shenzhen (CN); Xiangzhan Meng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 364 days.

(21) Appl. No.: 16/515,969

(22) Filed: Jul. 18, 2019

(65) Prior Publication Data

US 2019/0369648 A1 Dec. 5, 2019

Related U.S. Application Data

(63) Continuation of application No. PCT/CN2017/072050, filed on Jan. 22, 2017.

(51) Int. Cl.
*G05D 1/10* (2006.01)
*G05D 1/00* (2006.01)
(Continued)

(52) U.S. Cl.
CPC .......... *G05D 1/0011* (2013.01); *B64C 39/024* (2013.01); *G01S 19/14* (2013.01);
(Continued)

(58) Field of Classification Search
CPC .. G05D 1/0011; G05D 1/0016; G05D 1/0022; G05D 1/0033; G05D 1/0038;
(Continued)

(56) References Cited

U.S. PATENT DOCUMENTS

| 10,198,955 B1 * | 2/2019 | Boyd | G06F 16/29 |
| 2016/0070265 A1 * | 3/2016 | Liu | G05D 1/0088 701/3 |

(Continued)

FOREIGN PATENT DOCUMENTS

| CN | 101322881 A | 12/2008 |
| CN | 104516354 A | 4/2015 |

(Continued)

OTHER PUBLICATIONS

World Intellectual Property Organization (WIPO) International Search Report for PCT/CN2017/072050 dated Oct. 1, 2017 5 pages.

*Primary Examiner* — Thomas G Black
*Assistant Examiner* — Sara J Lewandroski
(74) *Attorney, Agent, or Firm* — Anova Law Group, PLLC

(57) ABSTRACT

A control method for controlling a movable device includes controlling a motion of the movable device based on a plurality of flight commands in a normal mode; and controlling the motion of the movable device based on a plurality of inverse commands in a reverse return flight mode. An execution order of the plurality of inverse commands is reverse of an execution order of the plurality of commands, the plurality of inverse commands are generated based on the plurality of flight commands, and an operation of each of the inverse commands is opposite to an operation of a corresponding flight command.

28 Claims, 4 Drawing Sheets

(51) Int. Cl.
*G01S 19/14* (2010.01)
*B64C 39/02* (2006.01)
(52) U.S. Cl.
CPC ........ G05D 1/106 (2019.05); *B64C 2201/027* (2013.01); *B64C 2201/146* (2013.01)
(58) Field of Classification Search
CPC .... G05D 1/0044; G05D 1/005; B64C 39/024; B64C 2201/00; B64C 2201/14; B64C 2201/141; B64C 2201/146
See application file for complete search history.

(56) References Cited

U.S. PATENT DOCUMENTS

| | | | | |
|---|---|---|---|---|
| 2016/0313734 A1* | 10/2016 | Enke | .................... | G05D 1/0038 |
| 2017/0195641 A1* | 7/2017 | Yang | .................... | B64C 39/024 |
| 2018/0173220 A1* | 6/2018 | Wang | .................... | B64C 27/006 |

FOREIGN PATENT DOCUMENTS

| | | | | | |
|---|---|---|---|---|---|
| CN | 104881039 A | | 9/2015 | | |
| CN | 105278544 A | | 1/2016 | | |
| CN | 105492985 A | | 4/2016 | | |
| CN | 105607645 A | * | 5/2016 | ........... | B64C 39/024 |
| CN | 105607645 A | | 5/2016 | | |
| CN | 105759775 A | | 7/2016 | | |
| CN | 105867181 A | | 8/2016 | | |
| CN | 106933243 A | * | 7/2017 | | |
| CN | 107077153 A | | 8/2017 | | |

* cited by examiner

CONTROL METHOD AND SYSTEM OF A MOVABLE DEVICE AND MOVABLE DEVICE THEREOF

CROSS-REFERENCE TO RELATED APPLICATION

This application is a continuation application of International Application No. PCT/CN2017/072050, filed on Jan. 22, 2017, the entire contents of which is incorporated herein by reference.

TECHNICAL FIELD

The present disclosure relates to a control method and a control system of a movable device, and a movable device thereof. The present disclosure further relates to a computer readable storage medium.

BACKGROUND

Since the Global Positioning System (GPS) signals are accurate and free of charge, and accurate to the extent required by Unmanned Aerial Vehicles (UAVs), most of the UAVs on the market rely on GPS navigation systems for flight and return flight route planning. However, once the GPS signal becomes irregular during the flight or the return flight of the UAV, the UAV may lose its guidance. At this point, an alternative solution is needed to continue to direct the UAV to fly to avoid crashing or losing the UAV. An alternative solution is called the attitude mode, in which an operator may directly operate the UAV to fly by visual means, but in the case of flights that are beyond the operator's visual line of sight, this solution may become inapplicable.

In particular, during a return flight that is beyond the line of sight, sometimes the flight is forced to return due to an interruption of the remote control signal or insufficient power. At this point, if there is no GPS signal guidance, the probability of an accident will be particularly high. At present, there is no effective alternative in the conventional technology.

In addition, there is a threat of hijacking an UAV through GPS spoofing. The general principle is to transmit a high-power GPS signal to a target UAV to flood the correct GPS signal, then trigger the return flight by interfering with the remote control signal. Since the GPS information at this time is the incorrect information designed by the hacker, the target UAV would return to the hacker's designated landing site, thereby achieving the purpose of hijacking the UAV.

SUMMARY

A first aspect of the present disclosure provides a control method for controlling a movable device. The method includes controlling a motion of the movable device based on a plurality of flight commands in a normal mode; and controlling the motion of the movable device based on a plurality of inverse commands in a reverse return flight mode. An execution order of the plurality of inverse commands is reverse of an execution order of the plurality of commands. Further, the plurality of inverse commands are generated based on the plurality of flight commands, and an operation of each of the inverse commands is opposite to an operation of a corresponding flight command.

A second aspect of the present disclosure provides a control system for a movable device having a processor and a memory. The processor controls a motion of the movable device based on a plurality of flight commands in a normal mode, and the processor controls the motion of the movable device based on a plurality of inverse commands in a reverse return flight mode. An execution order of the plurality of inverse commands is opposite to the execution order of the plurality of flight commands. Further, the memory stores the plurality of inverse commands, the plurality of inverse commands are generated based on the plurality of flight commands, and an operation of each of the inverse commands is opposite to an operation of the corresponding flight command.

A third aspect of the present disclosure provides a movable device having a processor and a memory and any one of the following: a GPS receiver for receiving GPS signals; a remote control signal receiver for receiving a remote control signal; a wind direction-wind speed measurement system for measuring a wind direction and a wind speed in real time; a direction senor for measuring movement direction information of the movable device in real time; a height sensor for measuring height information of the movable device in real time; an obstacle sensor for detecting an obstacle in the vicinity of the movable device in real time; and an image sensor for acquiring an image of the surrounding environment. Further, the processor controls a motion of the movable device based on a plurality of flight commands in a normal mode, and the processor controls the motion of the movable device based on a plurality of inverse commands in a reverse return flight mode. An execution order of the plurality of inverse commands is opposite to the execution order of the plurality of flight commands. Furthermore, the memory stores the plurality of inverse commands, the plurality of inverse commands are generated based on the plurality of flight commands, and an operation of each of the inverse commands is opposite to an operation of the corresponding flight command.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE EMBODIMENTS

Other aspects, advantages, and salient features of the disclosure will become apparent to those skilled in the art from the following detailed description, which, taken in conjunction with the drawings, discloses various embodiments of the present disclosure.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. In addition, identical reference numbers refer to identical function and operation throughout the accompanying drawings.

Embodiments of the present disclosure are described below using an UAV as an example of a movable device. However, it will be understood by those skilled in the art that the present disclosure is not limited thereto, but can be applied to various other movable devices such as a robot, a driverless car, and the like.

Figure 1:
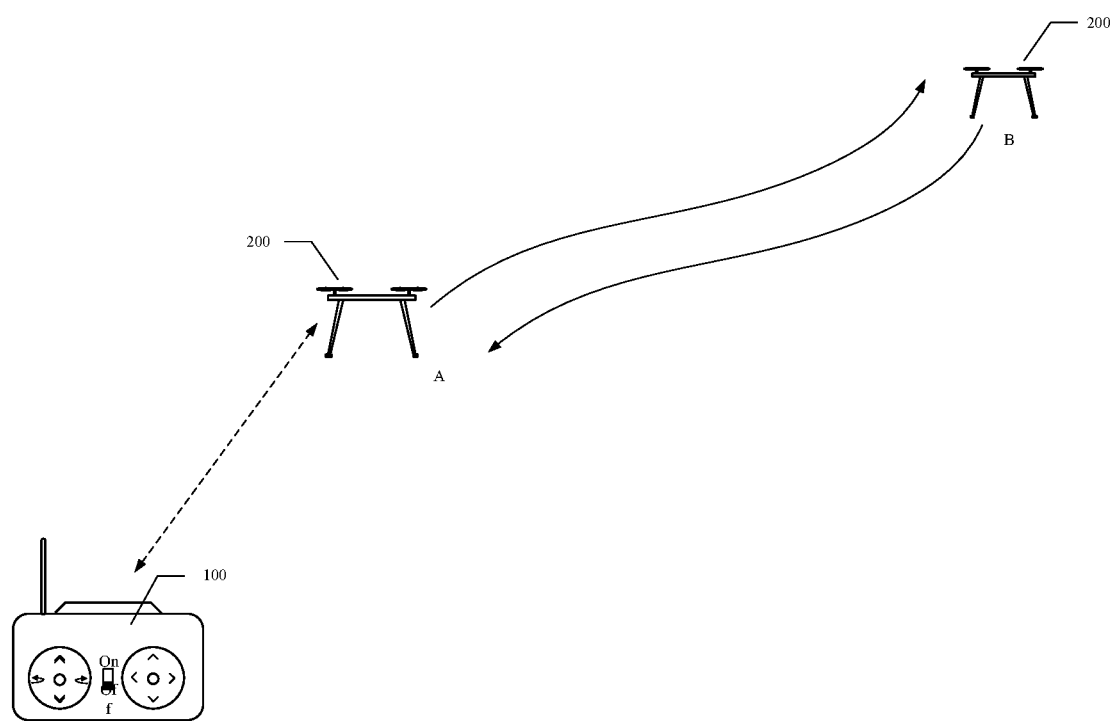
FIG. 1 schematically illustrates an application scenario according to an embodiment of the present disclosure.

FIG. 1 schematically illustrates an application scenario according to an embodiment of the present disclosure. As shown in FIG. 1, an operator may control an UAV 200 using a remote control device 100.

In one embodiment, the remote control device 100 may be a dedicated or universal remote controller, or it may be a mobile terminal such as a mobile phone, a tablet, or the like, on which a remote control application may be executed. The operator may control the UAV 200 through physical or virtual control components such as a joystick, a scroll wheel, a direction ball, buttons, etc. on the remote control device 100.

As shown in FIG. 1, under a normal mode, the UAV 200 may fly from location A to location B. The flight from location A to location B may be performed under the control of the remote control device 100, or the remote control device 100 may transmit the coordinates of a destination to the UAV 200, and the UAV 200 may automatically fly to location B under the guidance of a GPS signal. Further, location B may be a destination or a point during the flight.

At location B, the UAV 200 may determine to return back to location A. The return flight may be triggered by a predetermined event, which may include any one of the following events: the remote control signal of the UAV 200 may be lost, the GPS signal of the UAV 200 may be lost or abnormal, the UAV 200 may receive a return flight command, or the UAV 200 may be low on power.

In one embodiment, the UAV 200 may assume a reverse return flight mode during the return flight. Under the normal mode, the motion of the UAV 200 may be controlled based on a plurality of commands, each of which may include, for example, a direction of motion and a speed of motion of the UAV 200. Under the reverse return flight mode, the motion of the UAV may be controlled based on the inverse of the plurality of commands. Each of the plurality of inverse commands may be generated based on each of the plurality of commands, and the operation indicated by each of the inverse commands may be an operation opposite to the operation indicated by the corresponding command. An execution order of the plurality of inverse commands may be opposite to an execution order of the plurality of commands.

Figure 2:
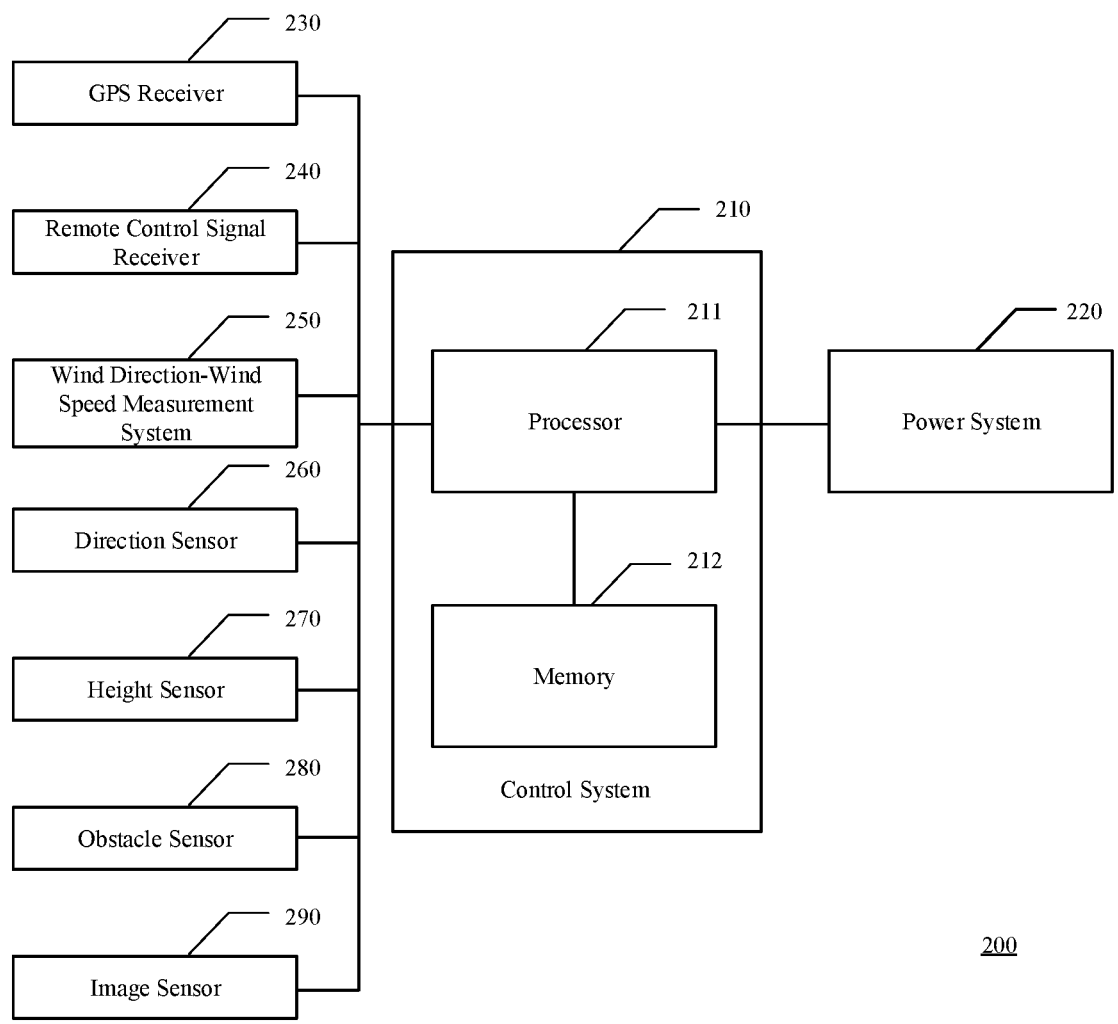
FIG. 2 is a block diagram illustrating the structure of an UAV according to an embodiment of the present disclosure.

FIG. 2 is a block diagram illustrating the structure of an UAV according to an embodiment of the present disclosure.

As shown in FIG. 2, the UAV 200 may include a control system 210 and a power system 220. The control system 210 may control an output of the power system 220 to control the motion of the UAV 200. The control system 210 may include a processor 211 and a memory 212. Under the normal mode, the processor 211 may control the motion of the UAV 200 based on a plurality of commands. Under the reverse return flight mode, the processor 211 may execute a plurality of corresponding inverse commands in the reverse order of execution of the plurality of commands to control the motion of the UAV 200, thereby implementing the reverse return flight. The memory 212 may be used to store commands and/or inverse commands. The inverse commands may be generated locally at the UAV 200 or received from the remote control device 100 along with the corresponding commands.

Figure 3:
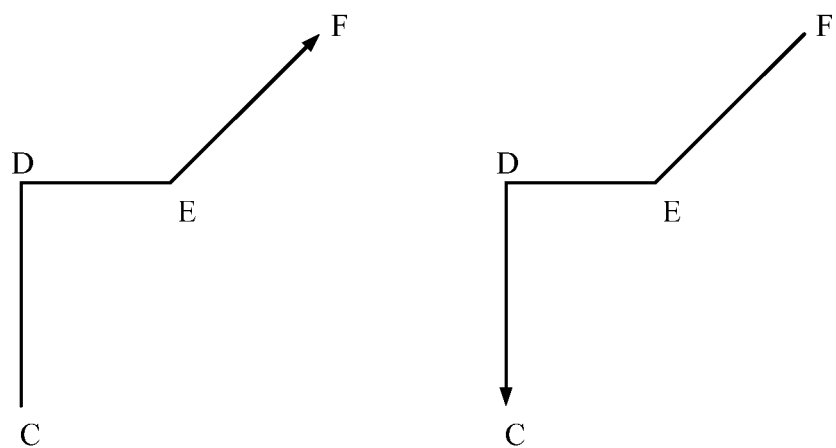
FIG. 3 is a schematic illustration of a flight path of an UAV in a normal mode and a reverse return mode according to an embodiment of the present disclosure.

FIG. 3 is a schematic illustration of a flight path of an UAV in a normal mode and a reverse return mode according to an embodiment of the present disclosure.

As described above, under the normal mode, the processor 211 may control the motion of the UAV 200 based on a plurality of commands. In one embodiment, each command may include a direction of motion and a speed of motion. For example, a command 1 may be [forward, 3 m/s]; a command 2 may be [right, 3.5 m/s]; a command 3 may be [forward and 45° to the right, 2.5 m/s], and so on. Under the control of these three commands, the flight path of the UAV 200 may be as shown in FIG. 3. More specifically, under the control of the command 1, the UAV 200 may fly from location C to location D; under the control of the command 2, the UAV 200 may fly from location D to location E; and under the control of the command 3, the UAV 200 may fly from location E to location F.

Under the reverse return flight mode, based on the command 1, command 2, and command 3, a corresponding inverse command 1', inverse command 2', and inverse command 3' may be respectively generated. In one embodiment, the inverse commands may include a direction of motion opposite to the corresponding command with the same speed of motion. For example, the inverse command 1' may be [backward, 3 m/s]; the inverse command 2' may be [left, 3.5 m/s]; and the inverse command 3' may be [backward and 45° to the left, 2.5 m/s]. Subsequently, the inverse command 3', inverse command 2', and inverse command 1' may be executed in a reverse order of the execution of the command 1, command 2, and command 3, and the UAV 200 may be controlled to fly back from location F to location C. More specifically, under the control of the inverse command 3', the UAV 200 may fly from location F to location E; under the control of the inverse command 2', the UAV 200 may fly from location E to location D; and under the control of the inverse command 1', the UAV 200 may fly from location D to location C.

It should be noted that the present disclosure does not require the reverse return flight path of the UAV 200 to strictly conform to the flight path in the normal mode if the two flight paths are substantially identical. As long as the UAV 200 is able to return to the vicinity of a departure point or within the operator's line of sight, the operator may successfully retrieve the UAV 200. Alternatively, as long as the UAV 200 is capable of receiving the remote control signal, the operator may remotely control the UAV 200 to return.

During the reverse return flight, a movement time of the UAV 200 may be monitored for each inverse command. Since the speed of the inverse command may be the same as the corresponding command, if the UAV 200 is flying under to control of the inverse command for the same time duration as under the control of the corresponding command, the UAV 200 may be returned to the location where the execution of the corresponding command started. For example, under to control of the command 3, the UAV 200 may fly forward and 45° to the right from location E at the speed of 2.5 m/s for 4 seconds to location F. During the reverse return flight, under the control of the inverse command 3', the UAV 200 may fly backward and 45° to the left from location F at the speed of 2.5 m/s also for 4 seconds to return to location E.

Alternatively, during the reverse return flight, a movement distance of the UAV 200 when each inverse command is executed may also be monitored. For example, under the control of the command 3, the UAV 200 may fly 10 meters from location E to location F. During the reverse return flight, under the control of the inverse command 3', the UAV 200 may fly backward and 45° to the left from location F also for 10 m to return to location E.

It should be understood that the above-described forms of the commands are merely exemplary and are intended to be illustrative of the disclosure and not to limit the scope of the invention. The embodiments of the present disclosure may implement the inversion of the flight state of the UAV 200 by executing the inverse commands and are not limited to any particular form of command.

In one embodiment, when a predetermined event occurs, the processor 211 may control the UAV 200 to enter the reverse return flight mode. The predetermined event may include any one of the following events: the remote control signal of the UAV 200 may be lost, the GPS signal of the UAV 200 may be lost or abnormal, the UAV 200 may receive a return flight command, or the UAV 200 may be low on power.

More specifically, as shown in FIG. 2, the UAV 200 may further include a GPS receiver 230 for receiving a GPS signal. When the GPS signal is missing or abnormal, the processor 211 may control the UAV 200 to enter the reverse return flight mode. In particular, when the UAV 200 is automatically flying under the guidance of the GPS signal, if the GPS signal is missing, the UAV 200 may not continue to fly along the correct path. At this time, the reverse return flight mode may be entered, and the UAV 200 may be controlled to return safely. An abnormal GPS signal may include, for example, an anomalous hopping of the GPS signal, which may be caused by a normal GPS signal being flooded by a high-power spoofing GPS signal. Under this situation, the UAV 200 may become the target of a hijack. In this case, entering the reverse return flight mode may avoid the interference of the spoofed GPS signal and achieve a safe return.

In one embodiment, the UAV 200 may further include a remote control signal receiver 240 for receiving the remote control signal from the remote control device 100. When the UAV 200 flies out of the receiving range of the remote control signal or when the remote control signal is blocked by an obstacle and unable to reach the UAV 200, the UAV may be out of control. At this point, the processor 211 may control the UAV 200 to enter the reverse return flight mode to safely return the UAV 200 without the remote control signal.

In one embodiment, the processor 211 may also control the UAV 200 to enter the reverse return flight mode upon receiving a return flight command. For example, the UAV 200 may be within the receiving range of the remote control signal, but outside the operator's line of sight. As such, the operator may not accurately control the movement of the UAV 200. At this point, the operator may issue a return flight command through the remote control device 100, and the processor 211 may control the UAV 200 to enter the reverse return flight mode upon receiving the return flight command. Alternatively, the UAV 200 may be within the receiving range of the remote control signal and within the operator's line of sight, but the operator may wish the UAV 200 to return automatically. At this point, the return flight command may also be issued by the remote control device 100, and the processor 211 may control the UAV 200 to enter the reverse return flight mode upon receiving the return flight command. It should be noted that the return flight command may not necessarily be issued by the remote control device 100. In one embodiment, the UAV 200 may also generate the return flight command locally when a predetermined condition is satisfied. For example, it may be predetermined that the UAV 200 may locally generate a return flight command when it is detected that the environment is not suitable to fly, for example, when it is detected that the ambient wind speed is greater than 10 m/s for 15 seconds.

In one embodiment, when the power of the UAV 200 is insufficient, for example, the power may be lower than a predetermined threshold, the reverse return flight mode may be entered.

In one embodiment, when the GPS receiver 230 receives the GPS signal again after the GPS signal is missing, the processor 211 may control the UAV 200 to exit the reverse return flight mode.

As shown in FIG. 2, in one embodiment, the UAV 200 may further include a wind direction-wind speed measurement system 250 for real-time measurement of a wind direction and a wind speed. During the flight of the UAV 200, the flight may be affected by wind. In the reverse return flight mode, the processor 211 may adjust the motion of the UAV 200 based on the wind direction and the wind speed measured in real time when the inverse command is executed, and the wind direction and wind speed measured when the corresponding command was executed.

Figure 4:
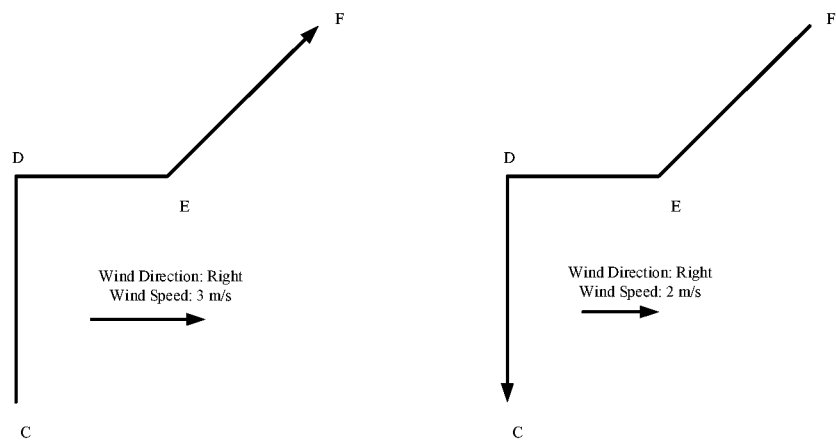
FIG. 4 schematically illustrates the principle of adjusting the motion of an UAV based on a wind direction and a wind speed according to an embodiment of the present disclosure.

FIG. 4 is a schematically illustrate the principle of adjusting the motion of an UAV based on a wind direction and a wind speed according to an embodiment of the present disclosure.

As shown in FIG. 4, the UAV 200 may be flying from location C to location D under the control of the command 1 [forward, 3 m/s], and wind direction may be measured to be to the right of the direction of C→D with the wind speed of 3 m/s. When the UAV 200 is under to control of the inverse command 1' [forward, 3 m/s] flying from location D to location C, if the wind direction is measured to be to the right of the direction of C→D with the wind speed of 2 m/s, then the movement of the UAV 200 from location D to location C may be adjusted accordingly to offset the impact of the wind.

For example, the flight speed of the UAV 200 when performing the inverse command may be adjusted such that a combined result of the flight speed and the wind speed may be substantially equal in magnitude and opposite in direction to the flight speed at which the corresponding command was executed. For example, based on the wind direction, the sum of the wind speed vectors measured twice may be to the right of the direction of C→D with the wind speed of 5 m/s. When the UAV 200 is flying from location D to location C, the direction of motion and the speed of motion indicated by the inverse command 1' [forward, 3 m/s] may be adjusted, and a movement speed of 5 m/s to the left of the direction of C→D may be added to offset the influence of the wind.

In one embodiment, the UAV 200 may further include a direction sensor 260, such as a compass. The direction sensor 260 may detect a change in the direction of the movement of the UAV 200 in real time. Generally, the change in the direction of motion of the UAV 200 when executing the inverse command may be reversed from the change in the direction of motion when the corresponding command was executed. By detecting the change in the direction of the motion of the UAV 200 in real time, the movement of the UAV 200 during the reserve return flight may be adjusted in real time to correct its direction of motion.

Further, the direction sensor 260 may detect information on the direction of motion of the UAV 200 in real time, such as a direction of motion or a change in the direction of motion. Generally, the direction of motion or the change in the direction of motion of the UAV 200 when executing the inverse command may be reversed from the change in the direction of motion when the corresponding command was executed. By detecting the direction of motion or the change in the direction of the motion of the UAV 200 in real time, the processor 211 may adjust the motion of the UAV 200 during the reverse return flight in real time to correct its direction of motion.

In one embodiment, the UAV 200 may further include a height sensor 270, such as an altimeter. The height sensor 270 may detect height information, such as a height or a change in height, of the UAV 200 in real time. Generally, the height of the UAV 200 when executing the inverse command may be the same as the height at which the corresponding command was executed, and the change in height may be reversed. By detecting the height or the change in height of the UAV 200 in real time, the processor 211 may adjust the motion of the UAV 200 during the reverse return flight in real time to correct its flight height.

In one embodiment, the UAV 200 may further include an obstacle sensor 280, such as an infrared sensor, a radar, or a camera. When the obstacle sensor 280 detects an obstacle, the processor 211 may control the UAV 200 to hover and wait for the obstacle to disappear, then continue to fly after the obstacle disappears. In one embodiment, when the UAV 200 encounters an obstacle in the reverse return flight mode and the obstacle does not disappear within a predetermined period of time, the processor 211 may calculate an obstacle avoidance route. The UAV 200 may be controlled to bypass the obstacle based on the obstacle avoidance route, and the route deviation caused by the obstacle avoidance route may be calculated after bypassing the obstacle, and the deviation may be corrected in the subsequent movement.

Figure 5:
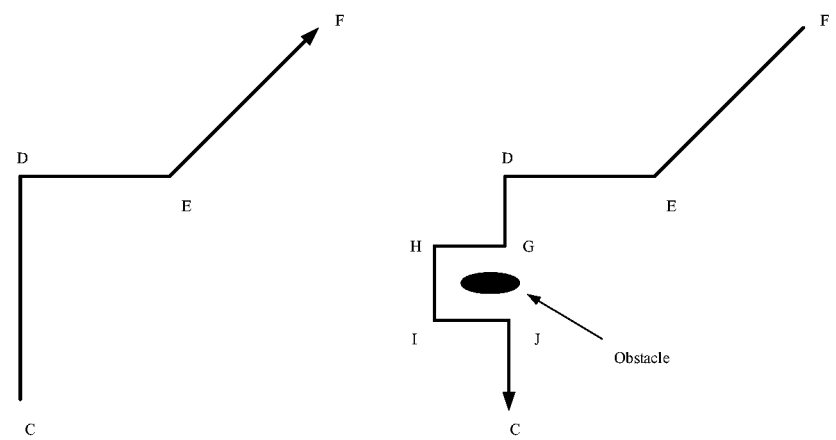
FIG. 5 schematically illustrates an obstacle avoidance process of the UAV during a reverse return flight according to an embodiment of the present disclosure.

FIG. 5 schematically illustrate an obstacle avoidance process of the UAV during a reverse return flight according to an embodiment of the present disclosure.

As shown in FIG. 5, under the normal mode, the UAV 200 may fly from location C to location F. Under the reverse return flight mode, the UAV 200 may fly from location F to location C. While flying from location D to location C, the UAV 200 may pass by location G and an obstacle, and the processor 211 may calculate and control the UAV 200 to bypass the obstacle via an obstacle avoidance route G→H. This obstacle avoidance process may cause a route deviation of the UAV 200. The processor 211 may calculate the route deviation of G→H and correct it by route I→J in the subsequent flight.

In one embodiment, the UAV 200 may further include an image sensor 290, such as a camera. When the UAV 200 is launched, the image sensor 290 may acquire an initial image of and around the departure point. When the UAV 200 returns to the vicinity of the departure point, the processor 211 may determine whether the UAV 200 has returned to the departure point by comparing an image acquired by the image sensor 290 in real time with the initial image. For example, when the UAV 200 takes off, the image sensor 290 may take a picture of the texture of the takeoff surface or the surrounding objects. When the UAV 200 returns to the vicinity of the takeoff point, the processor 211 may achieve an accurate landing by comparing the image of the takeoff point and the surrounding images.

Figure 6:
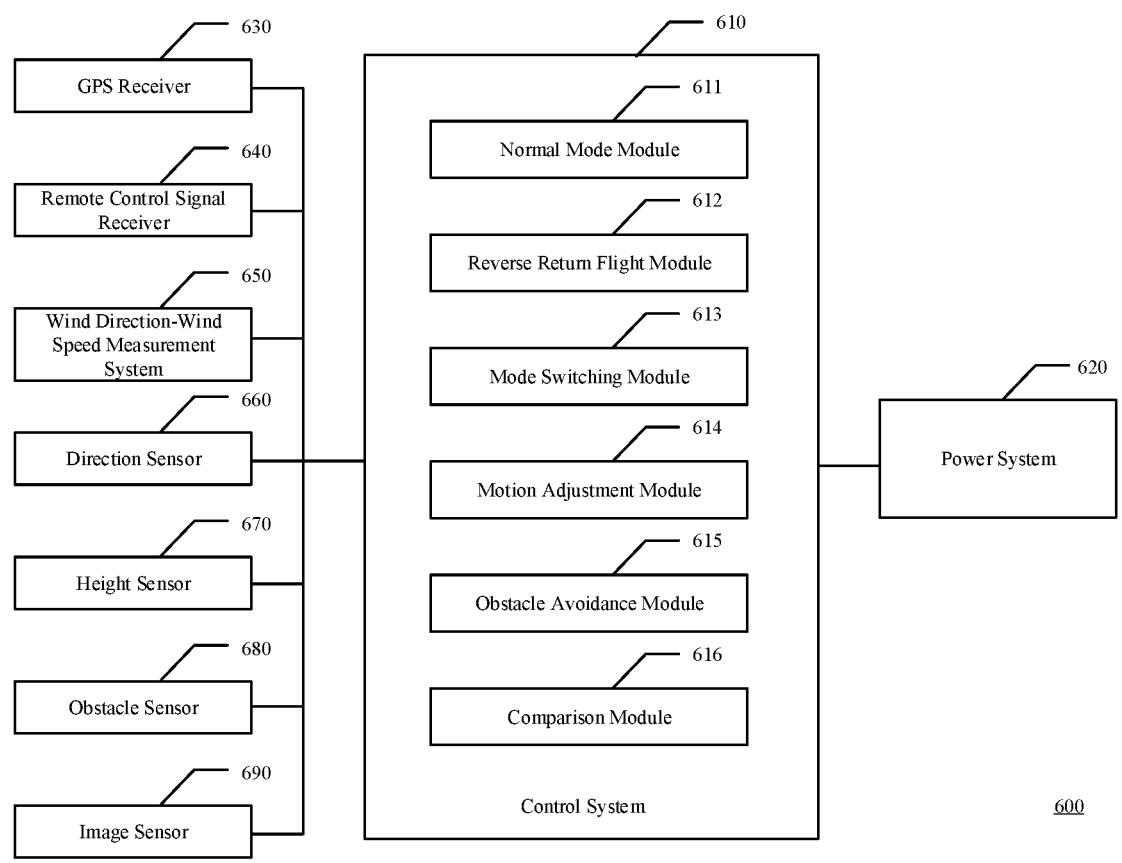
FIG. 6 is a block diagram illustrating the structure of an UAV according to an embodiment of the present disclosure.

FIG. 6 is a block diagram illustrating the structure of an UAV according to an embodiment of the present disclosure.

As shown in FIG. 6, the UAV 600 may include a control system 610 and a power system 620. The control system 610 may control an output of the power system 620 to control the motion of the UAV 600.

In one embodiment, the UAV 600 may further include a GPS receiver 630 for receiving GPS signals; a remote control signal receiver 640 for receiving remote control signals; a wind direction-wind speed measurement system 650 for real-time measurement of the wind direction and the wind speed; a direction sensor 660 for detecting information of the direction of motion of the UAV 600 in real time; a height sensor 670 for detecting information of the height of the UAV 600 in real time; an obstacle sensor 680 for detecting an obstacle in the vicinity of the UAV 600 in real time; and/or an image sensor 690 for acquiring an image of the surrounding environment. The control system may control the UAV 600 based on signals received or detected by the GPS receiver 630, the remote control signal receiver 640, the wind direction-wind speed measurement system 650, the direction sensor 660, the height sensor 670, the obstacle sensor 680, and the image sensor 690.

The GPS receiver 630, the remote control signal receiver 640, the wind direction-wind speed measurement system 650, the direction sensor 660, the height sensor 670, the obstacle sensor 680, and the image sensor 690 may be the same or similar to the GPS receiver 230, the remote control signal receiver 240, the wind-direction-wind speed measurement system 250, the direction sensor 260, the height sensor 270, the obstacle sensor 280, and the image sensor 290 described with reference to FIG. 2, and a detailed description thereof is omitted herein.

In one embodiment, the control system 610 may include a normal mode module 611. Under the normal mode, the motion of the UAV 600 may be controlled based on a plurality of commands. The control system 610 may further include a reverse return flight mode module 612. Under the reverse return flight mode, the motion of the UAV 600 may be controlled based on a plurality of inverse commands, and the execution order of the plurality of inverse commands may be opposite to the execution order of the plurality of commands. The plurality of inverse commands may be respectively generated based on each of the plurality of commands, and the operation indicated by each of the inverse commands may be opposite to the operation indicated by the corresponding command.

In one embodiment, the commands may include a direction of motion and a speed of motion, and the inverse commands may include a direction of motion opposite to the corresponding command with the same speed of motion. The movement time or the moving distance of the UAV 600 when each inverse command is executed may be the same as the movement time or the moving distance of the UAV 600 when the corresponding command was executed. The plurality of commands may be recorded locally in the UAV 600, and the inverse command may be generated locally at the UAV 600 or received externally.

Details of the commands, the reverse commands, and their related operations may be referred to the foregoing description in conjunction with FIG. 3, and details are not described herein again.

In one embodiment, the control system 610 may further include a mode switching module 613 that may control the UAV 600 to enter the reverse return flight mode when a predetermined event occurs. In one embodiment, the predetermined event may include any one of the following events: the remote control signal of the UAV 600 may be lost, the GPS signal of the UAV 600 may be lost or abnormal, the UAV 600 may receive a return flight command, or the UAV 600 may be underpowered. In one embodiment, after the GPS signal is missing and the GPS receiver 630 receives the GPS signal again, the mode switching module 613 may control the UAV 600 to exit the reverse return flight mode and control the UAV 600 based on the GPS signal. In one embodiment, after the remote control signal is missing and the remote control signal receiver 630 receives the remote control signal again, the mode switching module 613 may control the UAV 600 to exit the reverse return flight mode and control the UAV 600 based on the remote control signal.

In one embodiment, the control system 610 may further include a motion adjustment module 614 that may adjust the motion of the UAV 600 based on the wind direction and the wind speed measured by the wind direction-wind speed measurement system 650 in real time. For example, under the reverse return flight mode, the motion adjustment module 614 may adjust the motion of the UAV 600 based on the wind direction and the wind speed measured in real time while executing the inverse command, and the wind direction and wind speed measured when the corresponding command was executed. In one embodiment, the motion adjustment module 614 may calculate a sum of wind speed vectors based on the wind direction and wind speed measured in real time by the wind direction-wind speed measurement system 650 and the wind direction and wind speed measured when the corresponding command was executed. The motion adjustment module 614 may adjust the motion direction and motion speed indicated by the inverse command based on the sum of the wind speed vectors. For the wind direction and wind speed motion adjustment, refer to the description above with reference to FIG. 4, and details are not described herein again.

In one embodiment, the motion adjustment module 614 may also adjust the motion of the UAV 600 based on information of the direction of motion of the UAV 600, such as a direction of motion or a change in the direction of motion, detected by the direction sensor 660 in real time. For example, under the reverse return flight mode, the motion adjustment module 614 may compare the direction of motion or the change in the direction of motion of the UAV 600 measured in real time when the inverse command is executed with the direction of motion or the change in the direction of motion of the UAV 600 measured when the corresponding command was executed, and adjust the motion of the UAV 600.

In one embodiment, the motion adjustment module 614 may also adjust the motion of the UAV 600 based on height information of the UAV 600, such as a height or a change in height, detected by the height sensor 670 in real time. For example, under the reverse return flight mode, the motion adjustment module 614 may compare the height or the change in height of the UAV 600 measured in real time when the inverse command is executed with the height or the change in height of the UAV 600 measured when the corresponding command was executed, and adjust the motion of the UAV 600.

In one embodiment, the control system 610 may further include an obstacle avoidance module 615. Under the reverse return flight mode, when the obstacle sensor 680 detects an obstacle, the UAV 600 may be controlled hover and wait for the obstacle to disappear. When the UAV 600 encounters an obstacle in the reverse return flight mode and the obstacle does not disappear within a predetermined period of time, the obstacle avoidance module 615 may calculate an obstacle avoidance route. The UAV 600 may be controlled to bypass the obstacle based on the obstacle avoidance route, and the route deviation caused by the obstacle avoidance route may be calculated after bypassing the obstacle, and the deviation may be corrected in the subsequent movement. For the obstacle avoidance and the deviation correction operations, refer to the foregoing description in conjunction with FIG. 5, and details are not described herein again.

In one embodiment, the control system 610 may further include a comparison module 616 to determine whether the UAV 600 has returned to the departure point by comparing an image acquired by the image sensor 690 in real time with images of and around the departure point to achieve an accurate landing of the UAV 600.

The control system 610 and its modules mentioned above may be implemented by computer software, where each module may be implemented as a program module. However, it should be noted that the division of such module is not limited to the embodiments herein, and various modifications can be made by those skilled in the art without departing from the spirit of the invention.

In one embodiment, a non-volatile storage medium including machine readable instructions that, when executed by a processor, may cause the processor to perform the method as described above.

According to an embodiment of the present disclosure, the automatic return of the UAV may be realized without relying on the remote control signal and the GPS signal. Further high accuracy return may be achieved in an open environment with mild wind. Even if there is a wind in the environment, or an obstacle is encountered during the return flight, the method provided in the embodiments of the present disclosure may be used such that the UAV may return to the vicinity of the takeoff point with a high degree of probability. When the UAV returns to the vicinity of the takeoff point, the operator may remotely land the UAV accurately at the target location. Alternatively, automatic and accurate landing of the UAV may be achieved by comparing the images of the surrounding environment.

Based on embodiments of the present disclosure, the aforementioned method, system, and/or module may be implemented by using an electronic device having the computing capacity to execute software that comprises computer instructions. Such system may include a storage device for implementing various storage manners mentioned in the foregoing descriptions. The electronic device having the computing capability may include a device capable of executing computer instructions, such as a general-purpose processor, a digital signal processor, a specialized processor, a reconfigurable processor, etc., and the present disclosure is not limited thereto. Execution of such instructions may allow the electronic device to be configured to execute the aforementioned operations of the present disclosure. The above-described device and/or module may be realized in one electronic device, or may be implemented in different electronic devices. Such software may be stored in a computer readable storage medium. The computer storage medium may store one or more programs (software modules), the one or more programs may comprise instructions, and when the one or more processors in the electronic device execute the instructions, the instructions enable the electronic device to execute the disclosed method.

Such software may be stored in forms of volatile memory or non-volatile memory (e.g., storage device similar as ROM), no matter whether it is erasable or overridable, or may be stored in the form of memory (e.g., RAM, memory chip, device or integrated circuit), or may be stored in optical readable media or magnetic readable media (e.g., CD, DVD, magnetic disc, or magnetic tape, etc.). It should be noted that, the storage device and storage media are applicable to machine-readable storage device embodiments storing one or more programs, and the one or more programs comprise instructions. When such instructions are executed, embodiments of the present disclosure are realized. Further, the disclosed embodiments provide programs and machine-readable storage devices storing the programs, and the programs include codes configured to realize the device or method described in any of the disclosed claims. Further, such programs may be electrically delivered via any medium (e.g., communication signal carried by wired connection or wireless connection), and various embodiments may appropriately include such programs.

The method, device, unit and/or module according to the embodiments of the present disclosure may further use a field-programmable gate array (FPGA), programmable logic array (PLA), system on chip (SOC), system on the substrate, system on encapsulation, application-specific integrated circuit (ASIC), or may be implemented using hardware or firmware configured to integrate or encapsulate the circuit in any other appropriate manner, or may be implemented in an appropriate combination of the three implementation manners of software, hardware, and firmware. Such system may include a storage device to realize the aforementioned storage. When implemented in such manners, the applied software, hardware, and/or firmware may be programmed or designed to execute the corresponding method, step, and/or function according to the present disclosure. Those skilled in the relevant art may implement one or more, or a part or multiple parts of the systems and modules by using different implementation manners appropriately based on actual demands. Such implementation manners shall all fall within the protection scope of the present disclosure.

While the disclosure has been shown and described with reference to certain exemplary embodiments thereof, it will be understood by those skilled in the art that various changes in form and details may be made therein without departing from the spirit and scope of the disclosure as defined by the appended claims. Accordingly, the scope of the disclosure is not to be limited by the above embodiments but by the claims and the equivalents thereof.

What is claimed is:

1. A control method for controlling a movable device, comprising:
controlling a motion of the movable device based on a plurality of flight commands in a normal mode;
controlling the motion of the movable device based on a plurality of inverse commands in a reverse return flight mode, an execution order of the plurality of inverse commands is reverse of an execution order of the plurality of flight commands, wherein the plurality of inverse commands are generated based on the plurality of flight commands, and an operation of each of the inverse commands is opposite to an operation of a corresponding flight command; and
adjusting a movement of the movable device under the reverse return flight mode, including:
adjusting the movement of the movable device under the reverse return flight mode based on a wind direction and a wind speed corresponding to when the inverse command is executed and a wind direction and wind speed corresponding to when the corresponding flight command was executed.

2. The method of claim 1, wherein the plurality of flight commands include a command related to a direction of motion and a speed of motion; and an inverse command is related to a direction of motion opposite to the direction of motion in a corresponding flight command with the same speed of motion.

3. The method of claim 2, wherein a movement time or a movement distance of the movable device, when executing each inverse command, is the same as the movement time or the movement distance when a corresponding flight command is executed.

4. The method of claim 1, wherein the plurality of flight commands are recorded locally in the movable device; and the plurality of inverse commands are generated locally at the movable device or received externally.

5. The method of claim 4, further comprising:
controlling the movable device to enter the reverse return flight mode when an event occurs.

6. The method of claim 5, wherein the event includes any one of the following:
a remote control signal of the movable device being deficient;
a GPS signal of the movable device being deficient;
the movable device receiving a return flight signal; or
the movable device being low on power.

7. The method of claim 6, wherein when the remote control signal is received after the remote control signal is determined being deficient, exiting the reverse return flight mode and controlling the movable device based on the remote control signal.

8. The method of claim 6, wherein when the GPS signal is received after the GPS signal is determined being deficient, exiting the reverse return flight mode and controlling the movable device based on the GPS signal.

9. The method of claim 1, further comprising:
acquiring a plurality of initial images of and around a departure point; and
determining whether the movable device has returned to the departure point by comparing the images acquired in real time by the movable device with the initial images.

10. The method of claim 1, wherein adjusting the movement of the movable device under the reverse return flight mode based on the wind direction and the wind speed measured in real time and the wind direction and the wind speed measure when the corresponding flight command was executed includes:
calculating a sum of wind speed vectors from the wind direction and the wind speed corresponding to when the inverse command is executed and the wind direction and the wind speed corresponding to when the corresponding flight command was executed; and, adjusting a direction of motion and a speed of motion under the inverse command based on the sum of the wind speed vectors.

11. The method of claim 1, wherein adjusting the movement of the movable device under the reverse return flight mode further includes:
adjusting the movement of the movable device under the reverse return flight mode by comparing a direction of motion or a change in the direction of motion of the movable device corresponding to when the inverse command is executed with the direction of motion and the change in the direction of motion of the movable device corresponding to when the corresponding flight command was executed.

12. The method of claim 1, wherein adjusting the movement of the movable device under the reverse return flight mode further includes:
adjusting the movement of the movable device under the reverse return flight mode by comparing a height or a change in height of the movable device corresponding to when the inverse command is executed with the height or the change in height of the movable device corresponding to when the corresponding flight command was executed.

13. The method of claim 1, further comprising:
controlling the movable device to hover and wait for an obstacle to disappear when the obstacle is encountered in the reverse return flight mode;
calculating an obstacle avoidance route when the obstacle is encountered in the reverse return flight mode and the obstacle does not disappear in a period of time; and
controlling the movable device to bypass the obstacle based on the obstacle avoidance route, calculating a route deviation caused by the obstacle avoidance route after bypassing the obstacle, and correcting the route deviation in a subsequent motion.

14. A control system for a movable device, the system comprising a processor and a memory, wherein:
the processor controls a motion of the movable device based on a plurality of flight commands in a normal mode;
the processor controls the motion of the movable device based on a plurality of inverse commands in a reverse return flight mode, an execution order of the plurality of inverse commands is opposite to the execution order of the plurality of flight commands;
the memory stores the plurality of inverse commands, the plurality of inverse commands are generated based on the plurality of flight commands, and an operation of each of the inverse commands is opposite to an operation of the corresponding flight command; and
the processor adjusts a movement of the movable device under the reverse return flight mode, wherein adjusting the movement of the movable device includes:
adjusting the movement of the movable device under the reverse return flight mode based on a wind direction and a wind speed corresponding to when the inverse command is executed and a wind direction and wind speed corresponding to when the corresponding flight command was executed.

15. The system of claim 14, wherein the processor determines whether the movable device has returned to a departure point by comparing images acquired in real time by the movable device with previous images of and around the departure point.

16. The system of claim 14, wherein the flight commands include a command related to a direction of motion and a speed of motion; and the inverse commands include a command related to a direction of the motion opposite to the corresponding flight command with the same speed of motion.

17. The system of claim 16, wherein a movement time or a movement distance of the movable device when executing each inverse command is the same as the movement time or movement distance when a corresponding flight command is executed.

18. The system of claim 14, wherein the processor and the memory are installed in the movable device; and the inverse commands are generated by the processor or received externally.

19. The system of claim 18, wherein the processor controls the movable device to enter the reverse return flight mode when an event occurs.

20. The system of claim 19, wherein the event includes any one of the following:
a remote control signal of the movable device being deficient;
a GPS signal of the movable device being deficient;
the movable device receiving a return flight signal; or
the movable device being low on power.

21. The system of claim 20, wherein when the remote control signal is received after the remote control signal is determined being deficient, the processor controls the movable device to exit the reverse return flight mode and controls the movement of the movable device based on the remote control signal.

22. The system of claim 20, wherein when the GPS signal is received after the GPS signal is determined being deficient, the processor controls the movable device to exit the reverse return flight mode and controls the movement of the movable device based on the GPS signal.

23. The system of claim 14, wherein when an obstacle is encountered in the reverse return flight mode, the processor controls the movable device to hover and wait for the obstacle to disappear; and when the obstacle is encountered in the reverse return flight mode and the obstacle does not disappear in a period of time, the processor calculates an obstacle avoidance route, controls the movable device to bypass the obstacle based on the obstacle avoidance route, calculates a route deviation caused by the obstacle avoidance route after bypassing the obstacle, and corrects the route deviation in a subsequent motion.

24. The system of claim 14, wherein adjusting the movement of the movable device under the reverse return flight mode based on the wind direction and the wind speed corresponding to when the inverse command is executed and the wind direction and the wind speed corresponding to when the corresponding flight command was executed includes:
calculating a sum of wind speed vectors from the wind direction and the wind speed corresponding to when the inverse command is executed and the wind direction and the wind speed corresponding to when the corresponding flight command was executed; and
adjusting a direction of motion and a speed of motion under the inverse command based on the sum of the wind speed vectors.

25. The system of claim 14, wherein adjusting the movement of the movable device under the reverse return flight mode further includes adjusting the movement of the movable device under the reverse return flight mode by comparing a direction of motion or a change in the direction of motion of the movable device corresponding to when the inverse command is executed with the direction of motion and the change in the direction of motion of the movable device corresponding to when the corresponding flight command was executed.

26. The system of claim 14, wherein adjusting the movement of the movable device under the reverse return flight mode further includes adjusting the movement of the movable device under the reverse return flight mode by comparing a height or a change in height of the movable device corresponding to when the inverse command is executed with the height or the change in height of the movable device corresponding to when the corresponding command was executed.

27. A movable device, comprising a processor and a memory and any one of the following:
   a GPS receiver for receiving GPS signals;
   a remote control signal receiver for receiving a remote control signal;
   a wind direction-wind speed measurement system for measuring a wind direction and a wind speed in real time;
   a direction sensor for measuring movement direction information of the movable device in real time;
   a height sensor for measuring height information of the movable device in real time;
   an obstacle sensor for detecting an obstacle in the vicinity of the movable device in real time; and
   an image sensor for acquiring an image of the surrounding environment, wherein:
   the processor controls a motion of the movable device based on a plurality of flight commands in a normal mode;
   the processor controls the motion of the movable device based on a plurality of inverse commands in a reverse return flight mode, an execution order of the plurality of inverse commands is opposite to the execution order of the plurality of flight commands;
   the memory stores the plurality of inverse commands, the plurality of inverse commands are generated based on the plurality of flight commands, and an operation of each of the inverse commands is opposite to an operation of the corresponding flight command; and
   the processor adjusts a movement of the movable device under the reverse return flight mode, wherein adjusting the movement of the movable device includes:
      adjusting the movement of the movable device under the reverse return flight mode based on a wind direction and a wind speed corresponding to when the inverse command is executed and a wind direction and wind speed corresponding to when the corresponding flight command was executed.

28. The movable device of claim 27, wherein the movement direction information includes a direction of movement or a change in the direction of movement; and the height information includes a height or a change in height.

* * * * *